United States Patent
Bornemann

(10) Patent No.: US 9,700,965 B2
(45) Date of Patent: Jul. 11, 2017

(54) BASE FOR WELDING TYPE POWER SUPPLY

(71) Applicant: Brian J. Bornemann, Appleton, WI (US)

(72) Inventor: Brian J. Bornemann, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 985 days.

(21) Appl. No.: 13/844,470

(22) Filed: Mar. 15, 2013

(65) Prior Publication Data

US 2014/0263236 A1    Sep. 18, 2014

(51) Int. Cl.
   *B23K 37/02* (2006.01)
   *B23K 9/10* (2006.01)
   *B23K 9/32* (2006.01)

(52) U.S. Cl.
   CPC ........ *B23K 37/0258* (2013.01); *B23K 9/1006* (2013.01); *B23K 9/32* (2013.01); *Y10T 29/49826* (2015.01)

(58) Field of Classification Search
   CPC ..... B23K 37/0258; B23K 9/32; B23K 9/1006
   USPC ........................................................ 361/641
   See application file for complete search history.

(56) References Cited

U.S. PATENT DOCUMENTS

| | | | | |
|---|---|---|---|---|
| 4,166,195 A | * | 8/1979 | Schwab | H02G 5/06 174/101 |
| 5,642,260 A | * | 6/1997 | Sigl | B23K 9/32 174/16.1 |
| 5,942,729 A | * | 8/1999 | Carlson, Jr. | H02G 3/0418 174/66 |
| 6,870,131 B2 | * | 3/2005 | Achtner | B23K 9/1006 219/130.1 |
| 2003/0164645 A1 | * | 9/2003 | Crandell, III | B23K 9/1006 307/80 |
| 2008/0156787 A1 | | 7/2008 | Cigelske et al. | |

(Continued)

FOREIGN PATENT DOCUMENTS

| | | |
|---|---|---|
| DE | 29712951 | 11/1998 |
| JP | H11 68344 | 3/1999 |
| JP | 2005045025 | 2/2005 |

OTHER PUBLICATIONS

Dynasty 200DX Owner's Manual, Aug. 1, 2009, OM-245 730C, http://www.millerwelds.com/om/o245730c_mil.pdf, Miller Electric Manufacturing Co., Appleton, WI.

(Continued)

*Primary Examiner* — Thien S Tran
(74) *Attorney, Agent, or Firm* — George R. Corrigan

(57) ABSTRACT

A method and apparatus for providing welding type power is disclosed. The welding type power supply has fours sides, a top and a base. Two opposing of the sides and the top are part of a housing. A front panel and a back panel form the other two opposing sides. The front and back panel and the housing are joined such that the front and back panels and the first and second sides form the four sides of the welding type power supply. The base is comprised of extruded material, and has a first edge and a second edge. The first edge is joined to a bottom of the first side and the second edge is joined to a second bottom of the second side. Power and control circuitry disposed in the space formed between housing, front panel, back panel and base.

19 Claims, 4 Drawing Sheets

(56) References Cited

U.S. PATENT DOCUMENTS

| | | | |
|---|---|---|---|
| 2009/0180251 A1* | 7/2009 | Biagini | H05K 7/20409 361/690 |
| 2009/0284911 A1* | 11/2009 | Morehead | G06F 1/20 361/679.47 |
| 2010/0053869 A1 | 3/2010 | Sun et al. | |
| 2012/0107663 A1* | 5/2012 | Burgers | F28F 3/06 429/120 |

OTHER PUBLICATIONS

PCT International Search Report and Written Opinion, Jul. 14, 2014, European Patent Office, Rijswijk, Netherlands.

\* cited by examiner

BASE FOR WELDING TYPE POWER SUPPLY

FIELD OF THE INVENTION

The present disclosure relates generally to the art of welding type power supplies. More specifically, it relates to the housing and base for welding type power supplies.

BACKGROUND OF THE INVENTION

There are many different types of welding type power supplies. Most welding type power supplies are packaged in a housing with two opposing sides, front and back panels, and a top and a base. The power and control circuitry are disposed in the housing, and the various pieces are fixed together. Welding-type power supply, as used herein, refers to a power supply that can provide welding type power.

Different welding type power supply models include different components that have particular space needs. Thus, it is typical that each welding power supply model have its own housing. Even within a model family it is common to have models of different lengths (or different heights or widths).

Some welding type power supplies include a "U" shaped housing that forms the top and opposing sides of the welding type power supply. A metal base is provided, and the interior components are fixed to the base, and then the housing is fixed over the components and to the base. The end panels are affixed to the base and the housing.

Because models have different lengths, and different component locations, each model requires a distinct base with a distinct length and a distinct mounting pattern for components. Typically, the bases are pressed from sheet metal or made with an injection mold. The need for various bases results in a need for various molds or dies, thus making it relatively expensive to make a base.

Accordingly, a welding type power supply that has a more economical base is desired. Preferably the base will be useable for a variety of models.

SUMMARY OF THE PRESENT INVENTION

According to a first aspect of the disclosure, a welding type power supply has four sides, a top and a base. Two of the opposing sides and the top are part of a housing. A front panel and a back panel form the other two opposing sides. The front and back panel and the housing are joined such that the front and back panels and the first and second sides form the four sides of the welding type power supply. The base is comprised of extruded material, and has a first edge and a second edge. The first edge is joined to a bottom of the first side and the second edge is joined to a second bottom of the second side. Power and control circuitry is disposed in the space formed between the housing, front panel, back panel and base.

According to a second aspect of the disclosure, a welding type power supply includes four sides, a top and a base. Each of the four sides is joined at a bottom edge to the base and at a top edge to the top. Power and control circuitry are disposed in the space formed between four sides, the top and the base. At least one of the four sides, the top and the base are comprised of extruded material.

According to a third aspect of the disclosure, a method of making a welding type power supply having fours sides, a top and a base, includes providing an extruded base with edges, wherein the base is cut to a given length. Power and control circuitry are affixed to the base. A housing, having the given length and having first and second opposing sides and a top, is provided and placed over the base and components. The base and housing are joined. Front and back panels are joined to the housing such that the front and back panels and the first and second sides form the four sides of the welding type power supply and the power and control circuitry are in the space between the four sides, the top and the base.

The base is comprised of aluminum, preferably anodized, or in various embodiments.

The base has a constant cross section along an entire length in another embodiment. The entire length can extend from the front panel to the back panel.

The first edge and the second edge extend along the entire length and the include mounting channels in various embodiments. The base generally is in a first plane, and the first edge and the second edge extend upward in a plane generally perpendicular to the first plane in additional embodiments.

The bottom edges of the housing are disposed in the mounting channels without use of mechanical fasteners and/or the front panel and the back panel are affixed to the base and to the housing with or without mechanical fasteners in other embodiments.

The at least one of the four sides, the top and the base is the base and/or two opposing sides and/or the top.

Other principal features and advantages will become apparent to those skilled in the art upon review of the following drawings, the detailed description and the appended claims.

Figure 1:
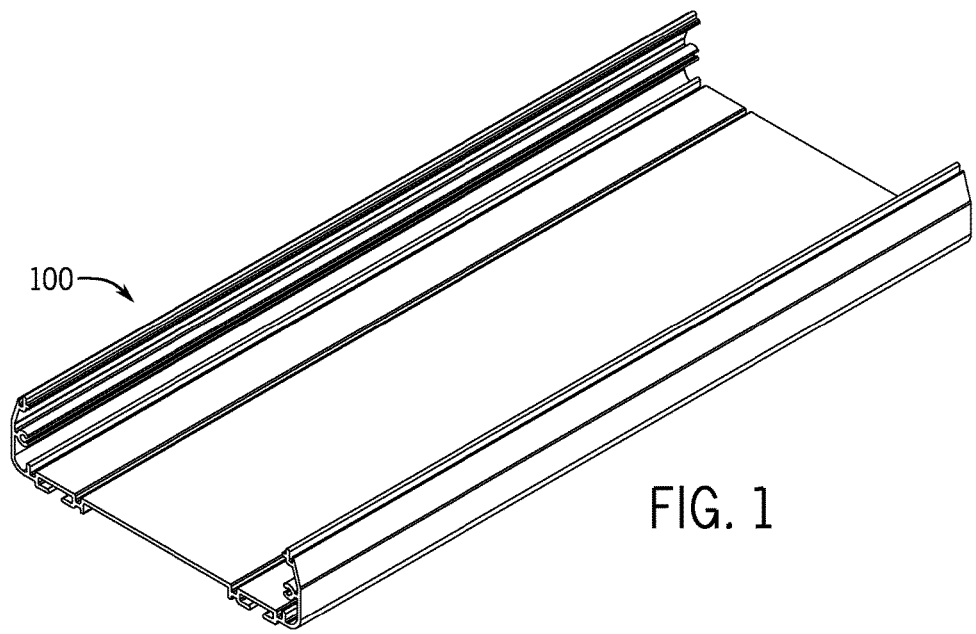
FIG. 1 is perspective view of a base for a welding type power supply.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding type power supply and particular components, it should be understood at the outset that other components and welding type power supplies may be used.

Generally, the preferred embodiment is a welding type power supply that has a U shaped housing mounted (inverted) to a base, and having end panels affixed to the base and housing. The power and control circuitry are disposed in the space formed by the housing, panels, and base.

The base is made from extruded material (preferably aluminum), and as an extruded piece has the same cross section along its entire length. The aluminum is preferably anodized (but not necessarily on the ends). Materials other than aluminum may be used. The cross section provides for channels for joining the sides to the base, and for channels or mounting devices to which the power and control components may be mounted.

To assemble the welding type power supply, the power and control components are mounted to a structure, such as a Miller™ Wind Tunnel (a welding power supply with controlled airflow). The lower edges of the Wind Tunnel (controlled airflow) are then held in channels or mounting devices in the base. This stops lateral motion of the Wind Tunnel (controlled airflow housing). The housing is placed over the base and Wind Tunnel (controlled airflow housing), and the lower edges of the housing rest in channels in the edges of the base. This holds the housing laterally, and does so without the use of screws or mechanical fasteners. The end panels are screwed (or otherwise affixed) to the base, the housing, and the Wind Tunnel (controlled airflow housing), thus holding everything in place vertically and medially.

Joined, as used herein, refers to two pieces being held in close or abutting relationship, and does not require the pieces to be affixed to one another. Mounting channel, as used herein, includes a channel on the extruded base or side to which components, panels, or the housing may be mounted. Mounting device, as used herein, includes a structure on the extruded base or side to which components, panels, or the housing may be mounted. Mounting channels are a specific type of mounting device.

This base may be used for any model so long as the width (determined by the width of the base), is the same. Larger models can be made by using longer bases—the extruded base is simply cut to the desired length. The mounting can be the same for any model, because channels extending the length of the base are used.

Figure 2:
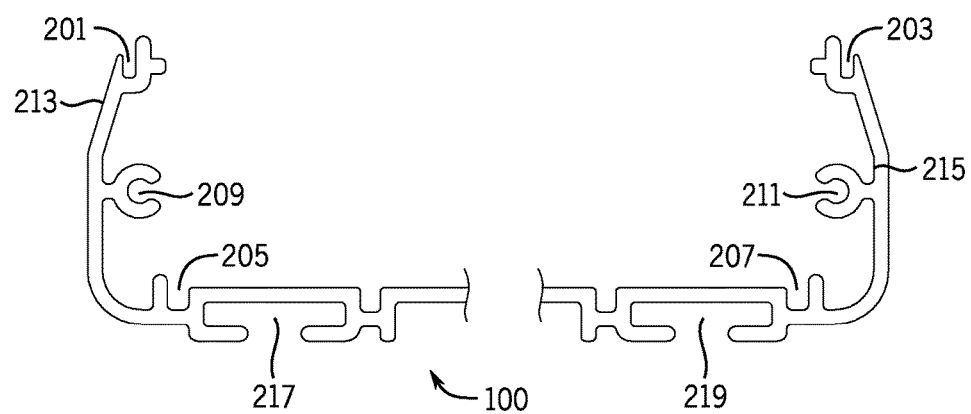
FIG. 2 is a cross sectional view of the base of FIG. 1.
Figure 3:
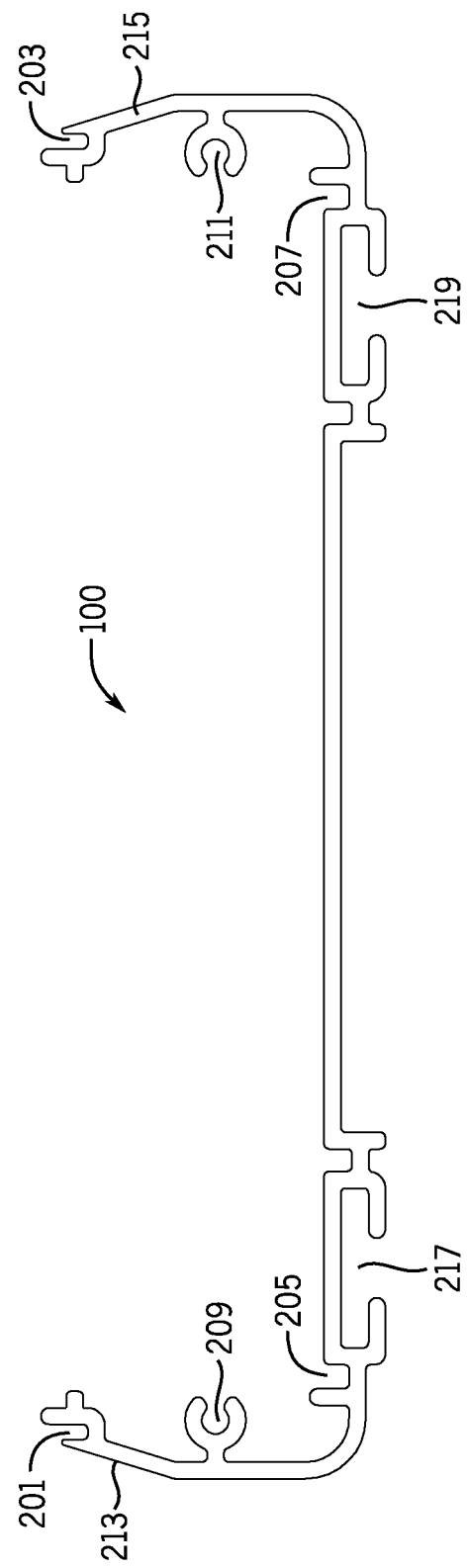
FIG. 3 is a cross sectional view of the base of FIG. 1.

An extruded base 100 is shown in perspective in FIG. 1. Because the base 100 is extruded, base 100 has the same cross section along its entire length. The cross section of base 100 may be seen in FIGS. 2 and 3. Base 100 includes mounting channels 201 and 203, mounting channels 205 and 207, and mounting devices 209 and 211.

Figure 5:
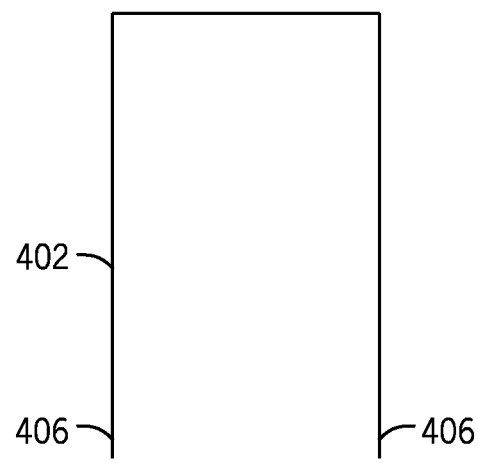
FIG. 5 is an end view of a welding type power supply housing.

FIG. 5 shows a U shaped housing 402 with bottom edges 404 and 406. Edges 404 and 406 are disposed in channels 201. The component structure (such as a Wind Tunnel or other controlled airflow housing) is disposed in channels 205 and 207, or devices 209 and 211. Housing 402 is joined to the base 100 by placing it in the channels. Other embodiments provide for a friction fit or mechanical fasteners. A pair of mounting channels 217 and 219 are on the bottom of base 100 and may be used to mount accessories to the welding type power supply, such as rubber feet.

A pair of side edges 213 and 215 of base 100 extend upward, and channels 201 and 203 are at the end of these sides. Edges 213 and 215 do not extend upward in other embodiments. Base 100 extends generally in a plane, and sides 213 and 215 extend generally in a plane perpendicular to base 100. Generally in a plane, as used herein, refers to a plane in which a majority of a base or side extends.

Figure 4:
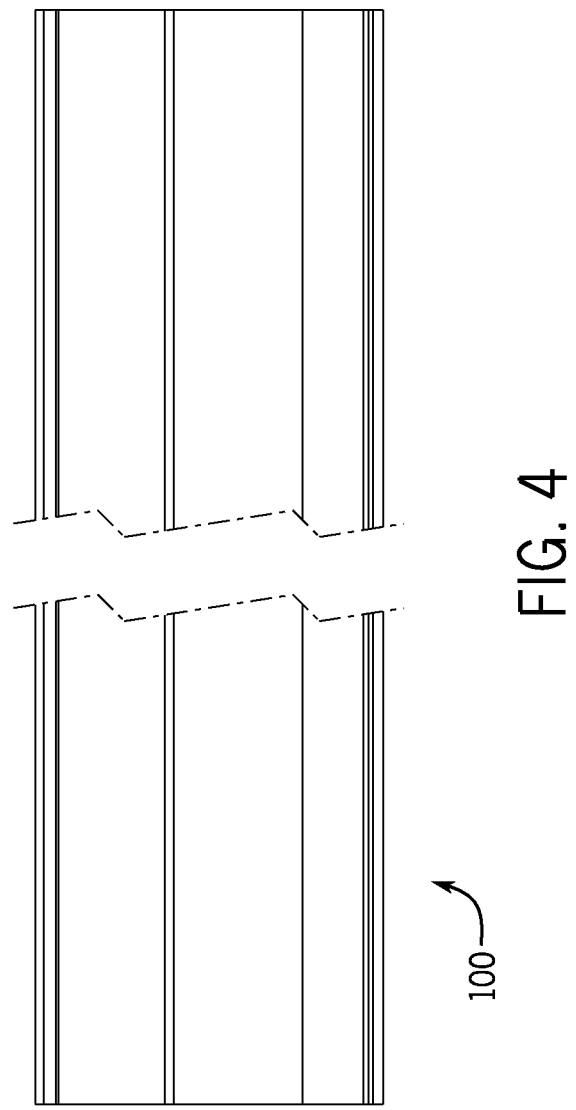
FIG. 4 is a side view of the base of FIG. 1.
Figure 6:
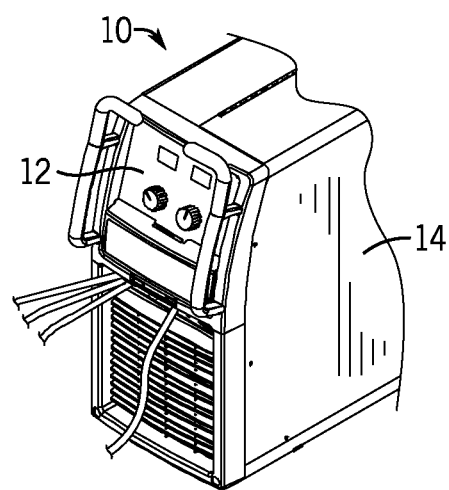
FIG. 6 is a perspective view of a welding type power supply housing.

FIG. 4 shows a side view of base 100, and FIG. 6 shows a welding type power supply 10 having side 14 and panel 12. Panel 12 could be the front or back panel. The side and panel are joined to a base, and the top may be seen.

One alternative embodiment provides for extruding sides rather than the base, or extruding two sides, top and base as a single piece. This embodiment can be curved, and still has a top bottom and two sides as those terms are used herein. Another embodiment includes an extruded top and bottom with the same cross section (or with different cross sections), with two end panels and two sides that complete the welding type power supply. Also, some embodiments include rounded corners, or even a cylindrical extrusion (for the base, sides and top). As used here, base, top and sides include curved surfaces. Other alternatives provide for angles other than ninety degrees, so that there are more than one surface per side. Another alternative is to extrude the top and bottom, and have four end caps.

Numerous modifications may be made to the present disclosure which still fall within the intended scope hereof. Thus, it should be apparent that there has been provided a method and apparatus for providing welding type power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding type power supply having fours sides, a top and a base, comprising:
   a housing, having first and second opposing sides and a top;
   a front panel and a back panel, wherein the front and back panel and the housing are joined such that the front and back panels and the first and second sides form the four sides of the welding type power supply;
   a base, wherein the base is comprised of extruded material, and has a first edge and a second edge, wherein the first edge is joined to a bottom of the first side and the second edge is joined to a second bottom of the second side, wherein the first edge and the second edge extend along the entire length and the first edge includes a first mounting channel in which the bottom of the first side is disposed, and the second edge includes a second mounting channel in which the bottom of the second side is disposed; and
   power and control circuitry disposed in the space formed between housing, front panel, back panel and base.

2. The welding type power supply of claim 1, wherein the base is comprised of aluminum.

3. The welding type power supply of claim 1, wherein the base as formed has a constant cross section along an entire length.

4. The welding type power supply of claim 3, wherein the entire length extends from the front panel to the back panel.

5. The welding type power supply of claim 4, wherein the base is comprised of anodized aluminum.

6. The welding type power supply of claim 5, wherein the base generally is in a first plane, and the first edge and the second edge extend upward in a plane generally perpendicular to the first plane.

7. The welding type power supply of claim 1, wherein the bottom of the first side is disposed in the first mounting channel and the bottom of the second side is disposed in the second mounting channel without the use of mechanical fasteners.

8. The welding type power supply of claim 7, wherein the front panel and the back panel are affixed to the base and to the housing.

9. A welding type power supply comprising:
fours sides, a top and a base, wherein each of the four sides is joined at a bottom edge to the base and at a top edge to the top; and
power and control circuitry disposed in the space formed between four sides, the top and the base;
wherein at least one of the four sides, the top and the base are comprised of extruded material; and
wherein the at least one of the four sides, the top and the base has a first edge and a second edge that each extend along an entire length of the at least one of the four sides, and the first edge includes a first mounting channel and the second edge includes a second mounting channel.

10. The welding type power supply of claim 9, wherein the extruded material is aluminum.

11. The welding type power supply of claim 10, wherein the at least one of the four sides, the top and the base as formed has a constant cross section along an entire length.

12. The welding type power supply of claim 1, wherein the at least one of the four sides, the top and the base is generally in a first plane, and the first edge and the second edge extend in a plane generally perpendicular to the first plane.

13. The welding type power supply of claim 1, wherein the at least one of the four sides, the top and the base is joined to at least one other of the four sides, the top and the base are adjacent without the use of mechanical fasteners.

14. The welding type power supply of claim 9, wherein the at least one of the four sides, the top and the base is the base.

15. The welding type power supply of claim 9, wherein the at least one of the four sides, the top and the base is the base, two opposing sides, and the top.

16. A method of making a welding type power supply having fours sides, a top and a base, comprising:
providing an extruded base having a first edge and a second edge, wherein the base is cut to a given length, wherein the first edge and the second edge extend the given length and the first edge includes a first mounting channel and the second edge includes a second mounting channel;
affixing power and control circuitry to the base;
providing a housing, having the given length and having first and second opposing sides and a top;
providing a front panel and a back panel;
joining the first side to the first mounting channel of the first edge and the second side to the second mounting channel of the second edge; and
joining a front panel and a back panel to the housing such that the front and back panels and the first and second sides form the four sides of the welding type power supply, and whereby the power and control circuitry are in the space between the four sides, the top and the base.

17. The welding type power supply of claim 16 wherein joining the first side to the first edge and the second side to the second edge is done with without the use of mechanical fasteners.

18. The welding type power supply of claim 16 wherein providing an extruded base included providing a base with a constant cross section along the given length.

19. A welding type power supply having fours sides, a top and a base, comprising:
a housing, having first and second opposing sides and a top;
a front panel and a back panel, wherein the front and back panel and the housing are joined such that the front and back panels and the first and second sides form the four sides of the welding type power supply;
a base having a given length, wherein the base is comprised of extruded material, and has a first mounting channel and a second mounting channel, wherein the first mounting channel and the second mounting channel extend the given length, wherein the first mounting channel is joined to a bottom of the first side and the second mounting channel is joined to a second bottom of the second side; and
power and control circuitry disposed in the space formed between housing, front panel, back panel and base.

\* \* \* \* \*